United States Patent [19]

Hileman

[11] 4,134,748

[45] Jan. 16, 1979

[54] LINKAGE FOR OPERATING A MOLD FOR A GLASS MAKING MACHINE

[75] Inventor: Kenneth R. Hileman, Anderson, Ind.

[73] Assignee: Lynch Corporation, Detroit, Mich.

[21] Appl. No.: 805,997

[22] Filed: Jun. 13, 1977

[51] Int. Cl.² .............................................. C03B 9/00
[52] U.S. Cl. ....................................... 65/237; 65/238; 65/359; 65/360; 65/361
[58] Field of Search ................. 65/357, 359, 360, 237, 65/235, 238, 361, 335

[56] References Cited

U.S. PATENT DOCUMENTS

| 2,049,422 | 8/1936 | Bridges | 65/235 X |
| 2,062,522 | 12/1936 | Miller | 65/360 X |
| 2,238,803 | 4/1941 | Berthold et al. | 65/238 X |
| 2,748,536 | 6/1956 | Allen | 65/360 |
| 3,867,123 | 2/1975 | Hamilton | 65/359 |

*Primary Examiner*—S. Leon Bashore
*Assistant Examiner*—Frank W. Miga
*Attorney, Agent, or Firm*—Allegretti, Newitt, Witcoff & McAndrews

[57] ABSTRACT

A mechanism for operating the molds of a glass molding machine. The glass molding machine includes a base and a table rotatably mounted on the base. The glass forming molds are operatively mounted on the rotary table. A plurality of work stations are provided on the base and cooperate to define glass molding cycle for each of the molds. The table is indexed by a drive through a preselected angle by a drive mechanism so that the molds are each moved to each of the work stations. An over the center linkage is provided for normally holding the molds in a closed position. An operating cylinder is at one of the work stations for selectively opening each mold for removal of the formed glass product during the cycle. The indexing drive moves each of the molds past the opening means at least one time during each cycle, each cycle generally being 720°, without opening the mold. The linkage also holds each of the molds in the open position for a selected interval for removal of the formed glass product. A cam is provided at another of the work stations for closing each of the molds, with the linkage holding each of the molds in the closed position for a selected time interval during the molding cycle.

5 Claims, 5 Drawing Figures

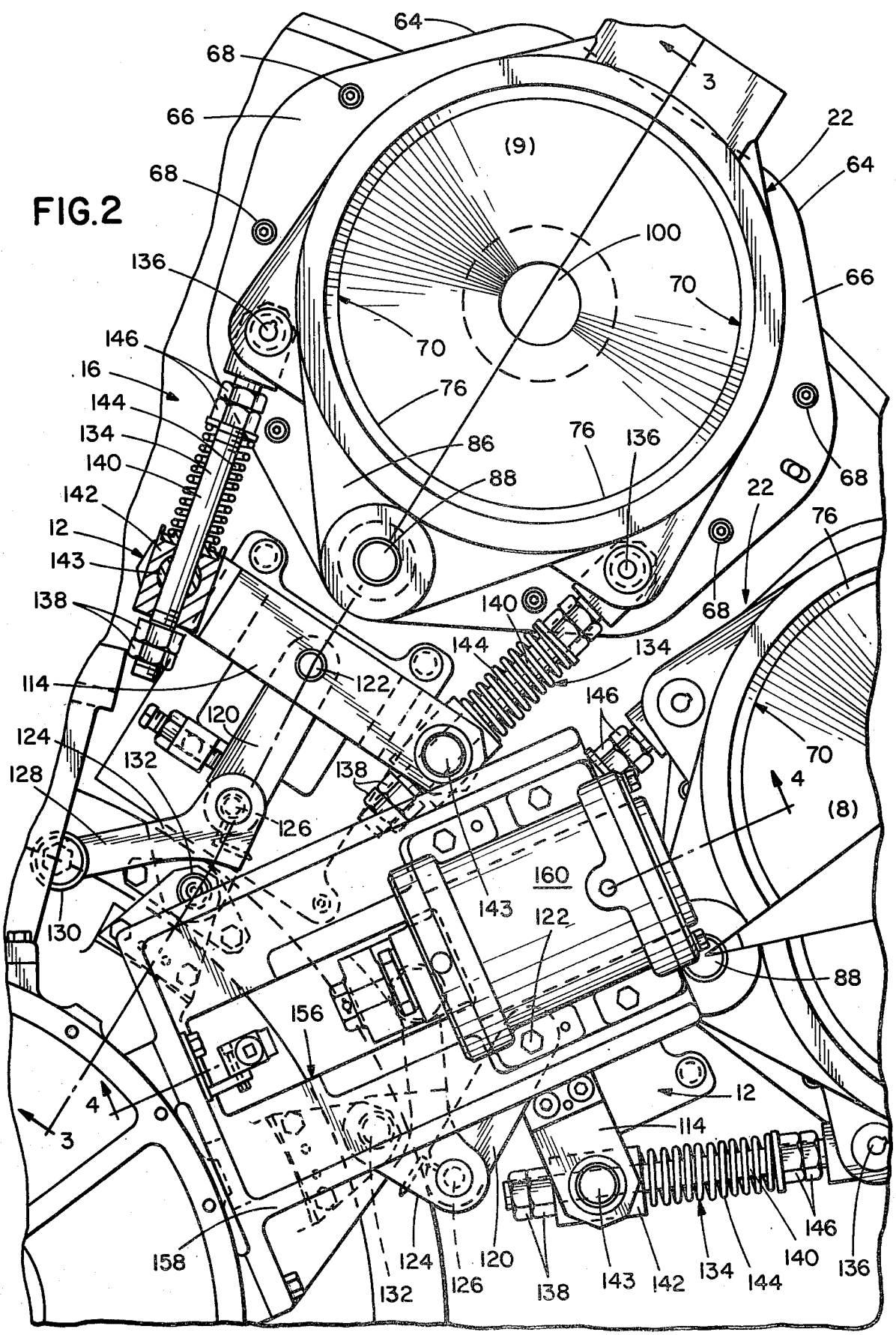

LINKAGE FOR OPERATING A MOLD FOR A GLASS MAKING MACHINE

BACKGROUND OF THE INVENTION

Field of the Invention and Description of the Prior Art

This invention relates to an improved mechanism for opening and closing the molds provided on a glass forming machine.

Glass products are formed in a variety of ways, one being by the provision of upwardly facing molds. A glass gob is delivered into the cavity of each mold and subsequently a press ram is driven down into the cavity to cooperate with the mold cavity to form the molten glass gob to the desired shape. Thereafter, the article must be formed and cooled at subsequent stations, the mold must be opened, and the glass product must be removed.

In conventional glass molding machines, the molds are rotated through 360° for one cycle of operation, from delivery of the glass gob through forming, cooling, take out, and mold preparation for receiving another glass gob. Generally, the mold includes a linkage which may be operated by a cylinder to open the mold at the take out position for removal of the glass product and a cam for subsequent closing of the mold at the delivery station. Generally, the cam is a 360° cam that holds the mold closed from the delivery station through the take out station with the cylinder opening the mold at the take out station and the cam closing the mold before it is rotated to the glass delivery station. Most of the conventional glass making machines operate with a 360° cycle.

In certain application, however, the molds may be rotated through more than 360°, such as two full revolutions or 720°. In such a system, the use of the 360° mold is unsatisfactory because the opening and closing of each mold takes place in a second 360° of mold revolution.

SUMMARY OF THE INVENTION

It is therefore an important object of this invention to provide an improved mechanism for opening and closing the molds of a glass forming machine when the molds are moved through more than 360°, such as 720°, for a full cycle of operation.

It is also an object of this invention to provide an improved mechanism for opening and closing the molds of a glass molding machine wherein an over-the-center linkage is utilized for holding the molds closed for in excess of 360° of movement without the need of a cooperating fixed cam.

It is another important object of this invention to provide an improved mechanism for opening and closing the molds of a glass molding machine of the type wherein the molds are rotated through 720°, wherein the molds are held in the closed position by an over-the-center linkage and a selectively operated cylinder opens the mold at the take out station, and a following cam closes the mold before the mold is passed to the delivery station.

It is still another important object of this invention to provide an improved mechanism for opening and closing the molds of a glass forming machine wherein the mechanism is characterized by its simplicity and economy in construction, manufacture and operation and effectiveness in use.

Further purposes and objects of this invention will appear as the specification proceeds.

The foregoing objects are accomplished by providing a mechanism for operating the molds of a glass molding machine wherein the mechanism includes a fixed support, a rotary support mounted on the fixed support, a plurality of glass forming molds operatively mounted on the rotary support, a plurality of work stations defined on the fixed support for defining a glass molding cycle for each of the molds, an indexing mechanism for rotating the rotatable support and thereby each of the molds through the glass molding cycle, an over-the-center linkage mechanism for selectively holding each of the molds in a closed position, an operating cylinder at one end of the stations for selectively opening each of the molds one time during the cycle, the indexing mechanism moving each of the molds past the opening means at least one time during the cycle without opening the mold, the linkage holding each of the molds in the open position for a selected interval, and a cam provided at another of the work stations for selectively closing each of the molds, the linkage selectively holding each of the molds in the closed position for a selected interval.

BRIEF DESCRIPTION OF THE DRAWINGS

Referring to the accompanying drawings, there is shown one particular embodiment of the present invention, wherein:

FIG. 2 is an enlarged, fragmentary top plan view illustrating two work stations and the mechanism for opening the molds;

DETAILED DESCRIPTION OF THE PREFERRED EMBODIMENT

Figure 1:
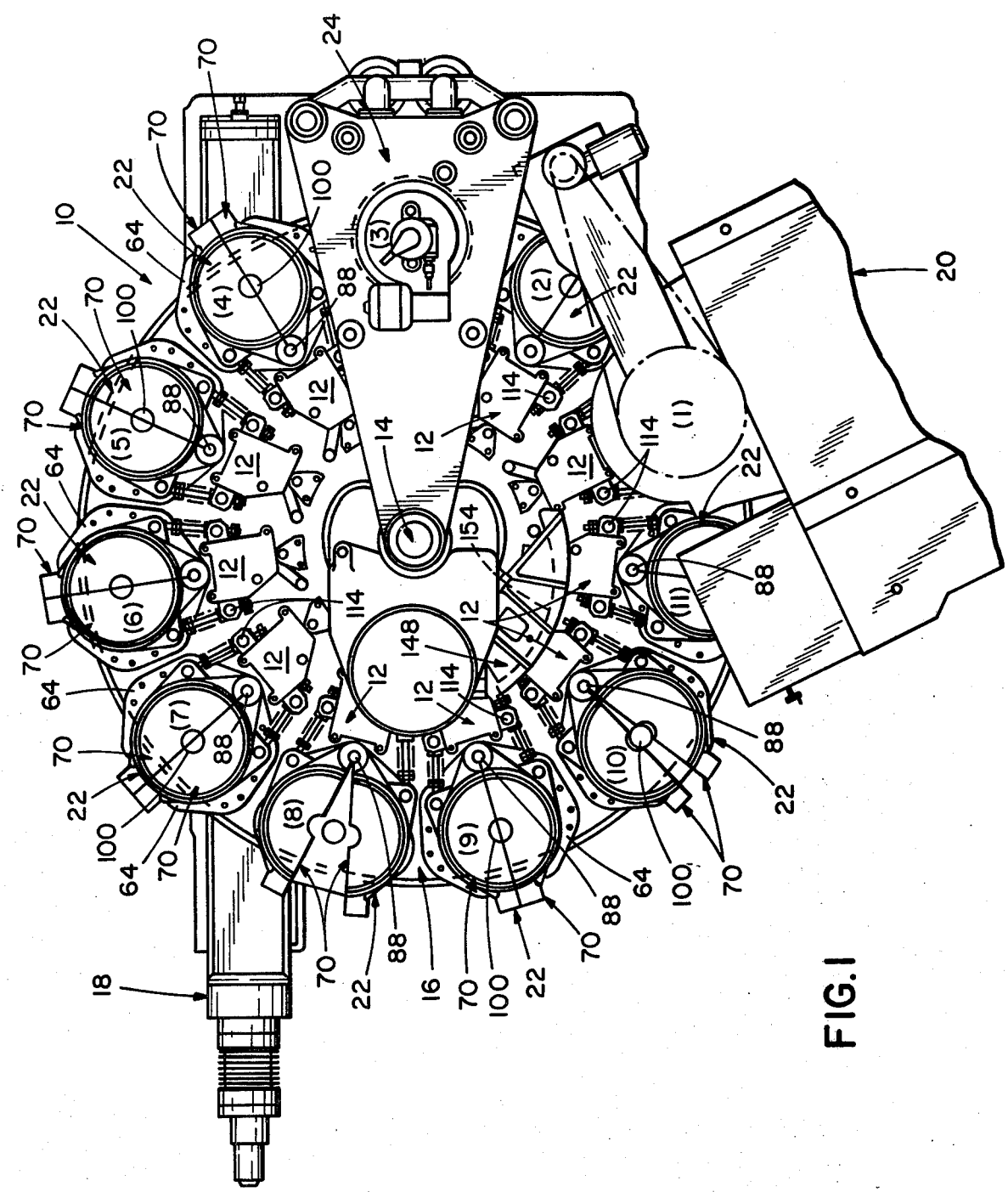
FIG. 1 is a top plan view of a glass molding machine utilizing my improved mold operating mechanism.

Referring to FIG. 1, there is shown a top plan view of a glass molding machine, generally 10, which utilizes our improved mold operating mechanisms, generally 12. The molding machine 10 includes a base (not shown) and an upright fixed central support column, generally 14, projecting therefrom. The mold operating mechanisms 12 are operatively mounted on the upper surface of a rotary table, generally 16, which is rotatably carried on the base (not shown) about a central upright axis. The table 16 is indexed by a drive mechanism, generally 18, which is fixed to the base (not shown) and which is operatively interconnected to the rotary table 16 for imparting the desired rotary, indexing motion thereto. A glass feeding assembly, generally 20, is located along the outer periphery of the rotary table 16 and is constructed and arranged to feed glass gobs downwardly into the molds, generally 22, when the molds 22 are in the closed position. A ram assembly, generally 24, is fixed relative to the central column 14 and is positioned, constructed, and arranged to move a press ram (not shown) into a mold 22 when a glass gob has been placed thereinto. The construction of the drive mechanism 18, the glass feeding mechanism 20, and the ram assembly 24 are generally of conventional construction and the details thereof will not be provided herein, as the invention herein is specifically directed to the design and operation of the mold operating mechanisms 12.

Referring to FIG. 1, a brief description will be provided for the operating cycle of the machine 10 so as to more fully understand the invention. Referring to FIG. 1, Numbers (1)–(11) located on the molds indicate the particular station at which a mold is located in one complete cycle of operation. Commencing with Station (1), mold 22 is in the closed position and a charge of glass is deposited into the mold by the glass feeding assembly 20. The mold is then indexed to Station (3), by-passing Station (2), where the press head or ram (not shown) lowers to press the glass into shape within the closed and locked mold 22. The table 16 is again indexed by the drive assembly 18, past Station (4) until the mold 22 reaches Station (5), where a final former (not shown) enters the mold to complete for formation of the glass within the mold 22. The drive assembly 18 then indexes the table 16 so that the mold 22 is indexed past Station (6) to Station (7), for tempering and cooling of the formed glass product (not shown). After remaining at Station (7) for a preselected time, the drive assembly 18 indexes the table 16 so that the subject mold 22 moves past Station (8) to Station (9) for further tempering and/or cooling of the mold 22 and the glass product. After the preselected time, the drive assembly 18 rotates the table 16 and the mold 22 past Station (10) until the mold 22 reaches Station (11) for further article cooling. Further article cooling is accomplished at Station (2), passing Station (1), at Station (4), passing Station (3) and at Station (6), passing Station (5). At Station (8), the mold 22 is opened in a manner to be hereinafter described, so the formed glass article (not shown) is removed by a take out assembly (not shown) of conventional design. The drive assembly 18 then indexes the table 16 and the mold 22 to Station (10) for mold cleaning and conditioning. Finally, the drive assembly 18 rotates the table 16 and the mold 22 back to Station (1) for commencing another cycle of operation. In moving from Station (8) to Station (1), the mold 22 is closed in stages in a manner to be hereinafter described in detail.

It is seen from the above general description that one complete cycle of the molding operation involves a rotation of each individual mold 22 from Station (1) through 720° of rotary movement. The drive mechanism 18 is constructed and arranged to rotate the table 16 through substantially equiangular increments of 65–66°. The indexing times and pause times are each the same and the total cycle time is adjustable, within conventional time limits for molding glass articles. Each of Stations (1)–(11) are substantially equiangularly spaced apart, as about 32¼°–33°.

From the foregoing general description of the glass molding machine 10 and its operating cycle, it is seen that a problem is encountered when the molds 22 must be rotated through two revolutions or 720°. In prior art devices, it has been conventional to use a full 360° cam arrangement (not shown) which opens and closes each mold (not shown) at take out and for glass gob delivery. When the molds 22 are rotated more than 360°, as 720°, a 360° cam cannot be used, because during the first 360° revolution of each mold 22, the mold 22 is to remain closed and it is only when the mold is in the second 360° of revolution that the mold 22 is opened for the take out and closed for glass delivery. The mold operating mechanisms 12, to be described, meet the necessary objectives for selectively opening and closing the molds 22 when each mold is moved through more than 360° for a complete cycle of operation.

Figure 2A:
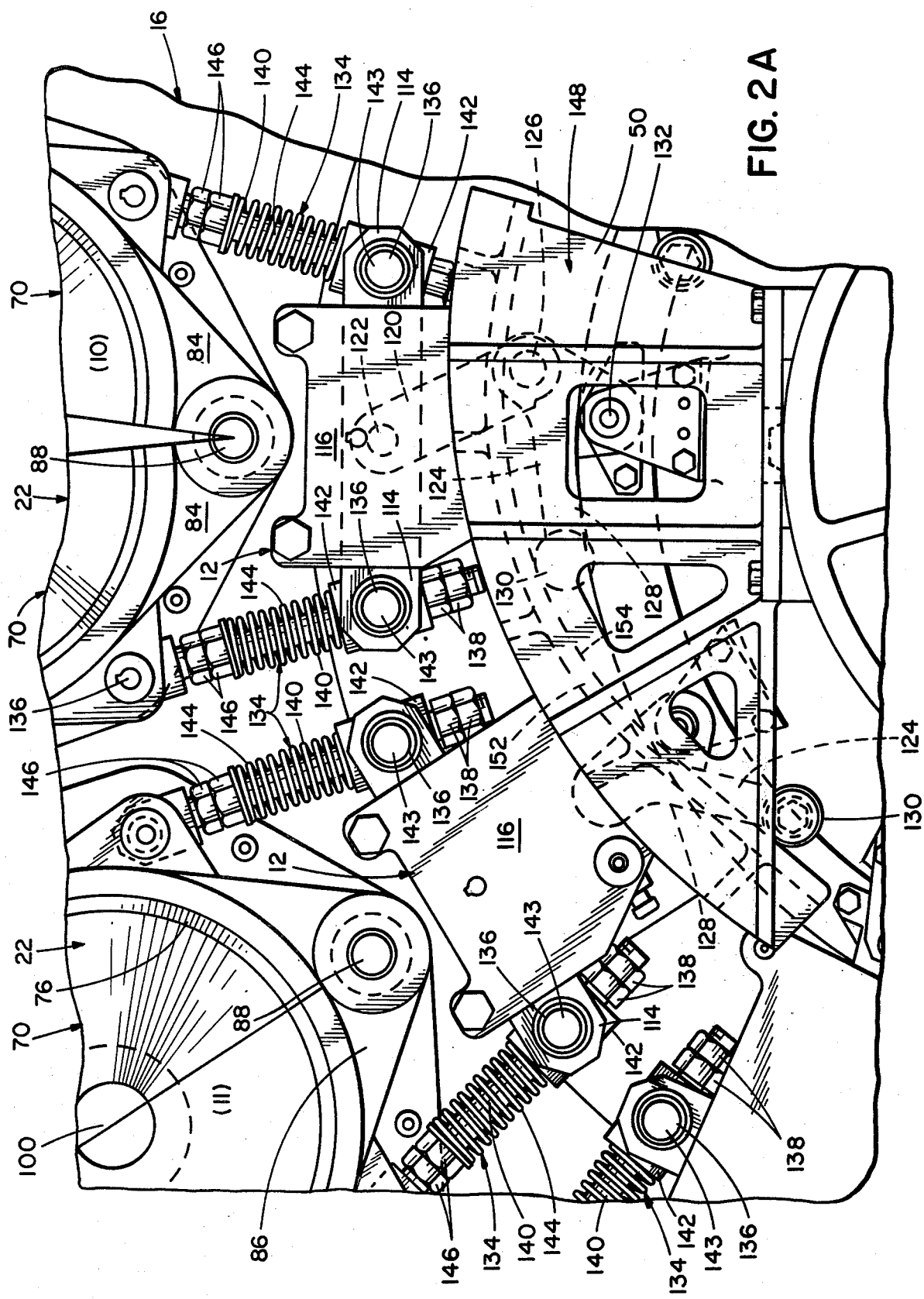
FIG. 2A is a view, similar to FIG. 2, at a subsequent station, and showing the mechanism for closing the open mold.

A detailed description of the construction of the molds 22 will be provided with reference to FIGS. 2, 2A, 3 and 4. FIG. 2 is an enlarged top plan view illustrating the mold operating mechanisms 12 and the molds 22 at Station (8) and Station (9), as shown in FIG. 1, except that FIG. 1, for convenience in illustration, does not show a mold opening mechanism 12, as shown in FIG. 2.

Figure 3:
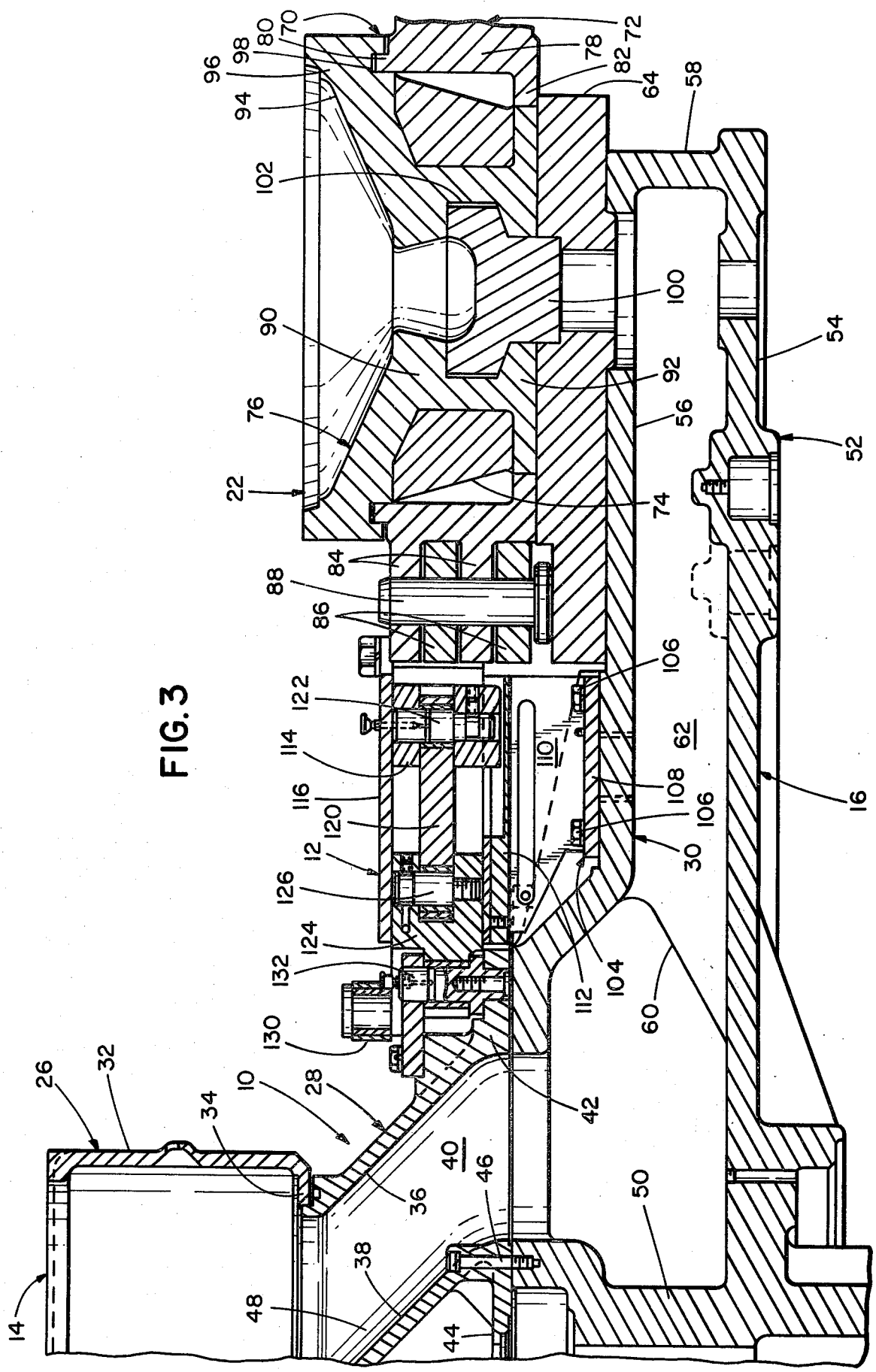
FIG. 3 is a transverse sectional view taken along the line 3—3 of FIG. 2 illustrating the over-the-center linkage utilized for opening and closing the mold.
Figure 4:
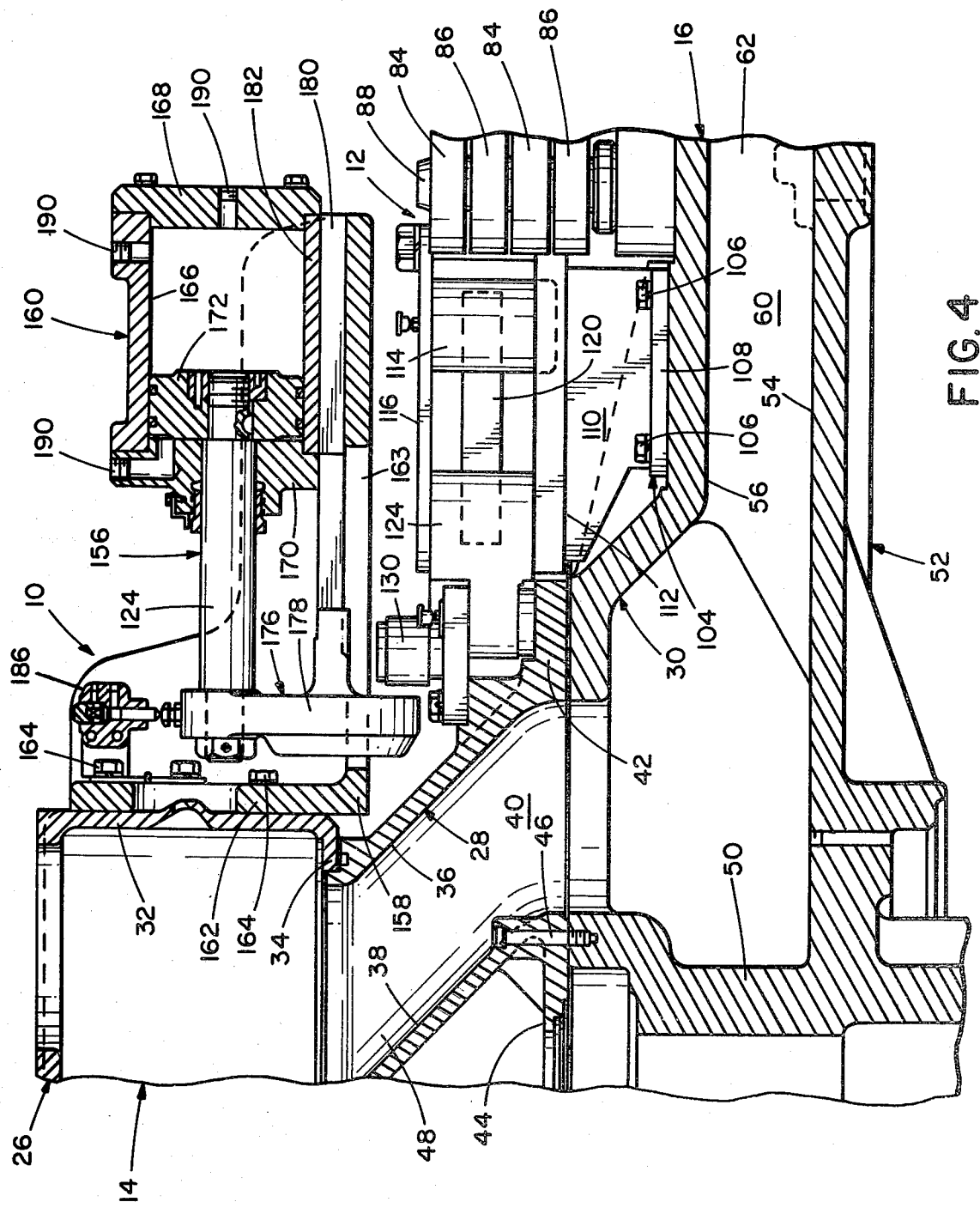
FIG. 4 is a transverse cross-sectional view taken along the line 4—4 of FIG. 2 particularly illustrating the air cylinder utilized for selectively opening the mold.

Referring particularly to FIGS. 3 and 4, the central column 14 includes an upper rigid, fixed support, generally 26, having a hollow interior. The rotary table 16 includes an upper rotary section, generally 28, and a lower rotary section, generally 30. The upper fixed support 26 includes an outer peripheral, upright wall 32 and an inwardly projecting lower flange 34 at the bottom of the outer wall 32. The rotary sections 28 and 30 rotate relative to the fixed upper support portion 26.

The upper rotary section 28 includes an outwardly and downwardly tapered outer wall 36 and an inwardly spaced inner tapered wall 38 which defines a hollow chamber 40 therebetween which communicates with the hollow interior of the upper fixed support 26. The outer tapered wall 36 terminates in an outwardly projecting lower flange 42 while the inner tapered section 38 terminates in an inwardly projecting lower flange 44. A plurality of bolts 46 pass through the lower flange 44 for rigidly securing the upper rotary section 28 to the lower rotary section 30. The tapered walls 36 and 38 are interconnected by a plurality of substantially radial upright walls 48 to define a plurality of the hollow chambers 40.

The lower rotary section 30 of the rotary table 16 includes a substantially upright, cylindrical central wall 50, the upper edge of which receives the bolts 46 passig through the lower flange 44 of the upper rotary section 28. The lower rotary section 30 further includes an outwardly projecting, substantially annular section, generally 52, having a lower rigid, horizontal wall 54, a substantially horizontal upper wall 56, a cylindrical outer wall 58 which rigidly interconnects the lower wall 54 to the upper wall 54, and a plurality of radial upright webs 60 for interconnecting the upper wall 56 to the lower wall 54. A plurality of chambers 62 are defined between the upper wall 54 and the lower wall 54 and between the webs 60. The hollow chambers 62, the hollow sections 40, and the hollow portion of the upper rotary section 28 communicate with a source of pressurized cooling air for cooling of the molds 22 and the glass product therein, in a known manner.

Referring particularly to FIGS. 2 and 3, each of the molds 22 includes lower fixed base, which is fixedly secured to the outer upper surface of the upper wall 56 of the lower rotary section 30. The base 64, as best seen in FIG. 2, includes a pair of laterally projecting flanges 66 and a plurality of upright bolts 68 which pass through the flanges 66 for securement to the upper wall 56 of the lower rotary section 30. The base 64 remains fixed while the remaining portions of each mold 22, to be hereinafter described, comprise a pair of mold half sections, generally 70, of substantially the same construction, which are slidable on the base 64. Each mold half-section 70 generally includes an outer section, generally 72, an intermediate rib section, generally 74, and an inner section, generally 76.

The outer mold section 72 includes a substantially upright semi-cyclindrical outer wall 78. The wall 78 includes a projecting upper edge 80 and an inwardly projecting lower flange 82 which terminates in a substantially circular inner edge. Referring to FIGS. 2 and 3, one outer mold section 72 includes a pair of spaced inwardly projecting ears 84 at the inner central portion thereof. The other outer mold section 72 also includes a pair of spaced ears 86 which are adjacent the ears 84. An upright rigid pin 88 is secured in the base 64 and pivotally receives the apertured ears 84 and 86 of each of mold half sections 70 in such a way that each mold half section 70 pivots about the upright axis of the pin 88 at selected times, hereinafter described in greater detail.

Each inner mold section 76 has its inner surface formed in the shape of the glass product to be formed. In the embodiment shown in FIG. 3, the two mold sections 76 are formed to mold a glass top, it is to be understood, of course, that the particular shape of the molding surface may vary over a wide range. The inner mold section 76 includes a central, upright substantially semi-cylindrical wall 90, a lower annular flange 92, defined at the lower end of the upright wall 90, and an upper section 94, defining the molding portion. The lower annular flange 92 is located adjacent to and inwardly of the semi-cylindrical edge defined along the inner periphery of the lower flange 82 of the outer mold section 72. The upper section 94 terminates in an outer upright wall 96 having a downwardly defined peripheral groove 98 which receives the upper semi-annular edge 80 of the outer mold section 72.

The intermediate rib section 74 is integral with the inner mold section 76 and defines an interior support portion for the inner mold section 76. The rib section 76 is located within a hollow space between the inner mold section 76 and outer mold section 72.

A centrally positioned lower mold section, generally 100, is generally circular in shape and is received in an inner peripheral groove 102 defined along the upright central wall 90 of the inner mold section 76. The central mold section 100 defines the lower portion of the molding surface. The lower surface of the central mold section 100 is positioned above aligned apertures in the base 64, in the upper wall 56 of the lower rotary section 30, and in the lower wall 54 of the lower rotary section 30. At the take out station only, a suitable mechanism is provided to remove the formed glassware product from the mold during the take-out operation.

Referring again to FIGS. 2 and 3, the mold operating mechanisms 12 will be described in detail. A support bracket, generally 104, is rigidly mounted on the upper surface of the upper wall 56 by securing bolts 106. The securing bolts 106 pass through a base portion 108 of the bracket 104. A pair of spaced upright walls 110 are secured to the upper surface of the base portion 108. An upper support plate 112 is securely mounted on the upper edges of the upright walls 110.

A crosshead member 114 is radially slidably mounted on the support bracket 104 between the upper support plate 112 of the support bracket 104 and an upper guide plate 116 spaced above the plate 112. A connecting link 120 is pivotally interconnected to the central portion of the crosshead 114 at tits outer end along the upright pivot member 122 mounted in the crosshead 114. The opposite or inner end of the connecting link 120 is pivotally connected to an operating link, generally 124, for pivotal movement about the axis of an upright pivot member 126. The operating link 124 includes an arm portion 128, which tapers outwardly when the molds 22 are in the closed position. The arm portion 128 carries a cam roller 130 at its outer end. The operating link 124 is pivotally interconnected, about a fixed pivot, to the lower flange 42 of the upper rotary section 28 by an upright pivot pin member 132.

The opposite ends of the radially slidable crosshead member 114 are each pivotally interconnected to a variable length, spring loaded link member, generally 134. Each of the variable length links 134 is pivotally interconnected to a mold half section 70 along an upright pivot member 136 secured to each mold half 70. The opposite end of the link 134 includes adjustable lock nuts 138 which are received on a threaded stud 140 which forms the link 134. The threaded stud 140 is slidably received within a pivot block 142 which is pivotally carried by each end of the crosshead 114, to provide for pivotal movement of the link 134 about the upright pivot 143 defined by the pivot block 142. A heavy compression spring 144 is carried around the threaded stud 140 and is positioned between the pivot block 142 and lock nuts 146 provided on the threaded stud 140, adjacent the pivot connection 136.

Referring to FIGS. 1 and 2A, a fixed mold operating cam, generally 148 is rigidly mounted on the central support column 14. As seen in FIG. 2A, the fixed cam 148 includes a substantially horizontal rigid support plate 150 and a downwardly projecting rigid cam defining wall 152 which defines an inwardly facing cam face 154 which gradually tapers inwardly along the arcuate length thereof, extending from approximately Station (10) through approximately Station (11). As will be described hereinafter, the inner cam face 154 cooperates with the cam roller 130 to cause each mold half section 70 to return to the normally closed position, from the open position, as seen for example, at Station (8), as seen in FIGS. 1 and 2.

Referring to FIGS. 2 and 4, a mold opening cylinder assembly, generally 156, is rigidly mounted on the upper fixed support 26. The mold opening cylinder assembly 156 generally includes a rigid support bracket 158 and an operating cylinder 160. The assembly is located at Station (8), the take out station, as seen in FIG. 2.

The cylinder support bracket 158 includes an upright wall portion 162 which is rigidly secured to the fixed upper section 26 by bolts 164 and an outwardly projecting cylinder support plate 163. The cylinder 160 includes an outer cylindrical wall 166 enclosed by cylinder head 168 and a blind end cylinder head 170. A piston 172 is reciprocally mounted within the cylinder 166. A piston rod 174 is connected, at one end, to a piston 172 which is slidably mounted within the cylinder 160, and at its opposite end to an arm assembly, generally 176. The piston rod 174 passes slidably and sealably through the head 170 of the cylinder 160. The cylinder 160 and piston 172 are generally radially mounted and the piston is horizontally movable.

The arm assembly 176 includes an upright section 178, which is rigidly secured to the inner end of the piston rod 176, and an outwardly projecting guide plate 180. The lower end of the upright section 178 is operatively positioned and is aligned inwardly of the cam roller 130. The lower end of the upright section 178 has a flat outer face for enabling the cam roller 130 to roll thereagainst as the section 178 is moved inwardly for opening the mold 22, in a manner to be hereinafter described. A guide plate 180, secured to the upright section 178, is guidably received in a guide space 182 defined between the lower side of the cylinder wall 166 and the support plate 163 of the support bracket 158. The upright section 178 passes through an open central portion 184 defined in the horizontal plate 163. The guide plate 180 guidably supports the inward and outward movement of the arm assembly 176.

An air valve 186 is mounted above a tripper on the upright section 178 of the arm assembly 176. A vertically reciprocal valve pin 188 is opened indicating the opening cylinder to be in a safe position and allowing the next signal for machine movement to pass through valve 186 when the cylinder 160 is returned to the start position. Suitable valving (not shown) is provided to interconnect a pressurized air source (not shown) to the ports 190 provided in the cylindrical wall 166, the outer wall 168 and inner wall 170, of the cylinder 160.

Although the foregoing description of the inventive structure would teach one having skill in the art to practice the invention herein, a detailed description of the operation of the mold operating mechanisms 12 for the glass making machine 10 will be described in detail for a more full understanding of the invention.

Referring to FIG. 1, at Station (1), the mold half sections 70 are both in the closed position and the mold 22 is positioned to receive a charge of molten glass at substantially the central portion thereof from the glass feeding assembly 20. In the closed and locked position, the slidable crosshead 114 is in the radial outermost position. The operating link 124 and the connecting link 120 cooperate to define an over-the-center linkage for normally maintaining each mold half section 70 in the closed and locked position.

To understand the "over-the-center" linkage, reference is made to FIG. 2, wherein it is seen that the pivot connection 126 is located to the left of an imaginary center line interconnecting the pivot connection 122 to the pivot connection 132. Also in this position, the force of the compression spring 144, between the pivot block 142 and the lock nuts 144, maintains each mold half section 70 together in a rigidly closed and locked position. The design and construction of the over-the-center linkage result in no further exterior force being needed for maintaining the mold half sections 70 in the closed and locked position.

The drive mechanism 18 of the glass molding machine 10 rotates the rotary table 16 through approximately 65° from Station (1) to Station (3). At Station (3), a press ram (not shown) lowers into the mold 22 and cooperates therewith to form the glass into the desired shape within the mold 22. At this time, the links 120 and 124 are still in the over-the-center, locked position.

After a preselected period of time, the press ram (not shown) is removed from the mold 22 and the table 16 is again indexed through about another 65° to Station (5). At this station, the linkage again remains in the over-the-center locked position and the final glass former (not shown) enters the mold to accomplish the final forming of the glass.

Again, after a preselected interval, with the final former removed from the mold 22, the drive 18 rotates the table 16 through the preselected angle of rotation for movement to Station (7), then to Station (9), to Station (11) to Station (4), and to Station (6). At Stations (7), (9), (11), (2), (4) and (6), the formed glass article is being tempered and/or cooled. At all these stations, the linkage remains in the over-the-center locked position.

In moving the mold from Station (7) to Station (9), it should be noted, the linkage moves past Station (8) and the trip arm assembly 176. As seen best in FIG. 4, the arm 176 is spaced radially inwardly of the cam roller 130, therefore, and has no effect on the trip arm. Also, in moving from Station (9) to Station (11) in the first 360° of the cycle, the cam roller 130 also moves past the inner cam face 154 without any effect thereon since the cam face, except for the innermost portion thereof, does not engage the cam roller 130 to operate the operating link 124, for pivoting thereof about the pivot axis 132.

The invention is particularly useful at this stage of the cycle as the over-the-center linkage continues to hold the mold in place without any exterior help and when being moved past the cam face 154 and the operating cylinder 160 in the first 360° revolution there is no effect on the over-the-center linkage holding the mold half sections 70 closed.

When the mold 22 with the formed glass article therein is indexed from Station (6) to Station (8), for the glass ware take out operation, the air cylinder 160 is operated. As seen in FIGS. 2 and 4, the arm section 178 engages the cam roller 130 as pressurized air enters the rod side of the piston 172. The arm 178 is guided radially outwardly to engage and move the cam roller 130 outwardly and to pivot the operating link 124 about the fixed pivot 132. As this occurs, the pivot connection 126 moves past the imaginary line interconnecting the pivot connections 122 and 132 thereby moving the linkage, past the over-the-center locked position thereby unlocking the mold half sections 70. The spring loaded links also cooperate to hold the half section open for a selected period of time. As seen best in FIG. 2, when this occurs, the crosshead 114 is moved radially inwardly and thereby causes each variable length link 134 to pivot the mold half sections 70 about their common pivot connection 88 to open the mold 22 to the open position. The mold half sections 70 open to approximately a 24° angle of opening. The take-out mechanism (not shown) then removes the formed glass article from the mold 22 in a known manner. Also, at this time, the piston 172 returns the arm 176 to the start position where assembly 176 operates the valve 186, thereby opening the valve 186 in preparation for the next signal for the machine index. After the article is removed from the mold, the mold still remains in the open position at Station (8). When the mold 22 is indexed from Station (8) to Station (10), the cam follower 130 intercepts the first portion of the cam face 154 to partially close the mold to an approximate angle of 12° at Station (10). At Station (10), the mold is cleaned by a jet of air and is conditioned for receiving another charge of glass.

Finally, the drive 18 rotates the rotary table 16 so that the mold 22 moves from the mold cleaning and conditioning Station (10) past station (11) to Station (1), and during this movement, the cam face 154 completes the closing of the mold half sections 70 by engaging the roller 130 and pivoting the arm about the fixed pivot 132. The links 120 and 124 are then moved across the over-the-center position until the mold half sections 70 are in the locked position. When the pivot 126 of the links 120 and 124 is moved past the center line between the pivots 122 and 132, the links 120 and 124 snap, forcibly, over the center position to thereby cause the mold half sections to stay in the closed and locked position at Station (1) and at the subsequent stations, as described above.

While in the foregoing there has been provided a detailed description of one particular embodiment of the present invention, it is to be understood that all equivalents obvious to hose having skill in the art are to be included within the scope of the invention as claimed.

What I claim and desire to secure by Letters Patent is:

1. A mechanism for operating molds of a glass molding machine, said mechanism comprising, in combination, a fixed support, a movable support rotatably mounted on said fixed support, a plurality of glass forming molds operatively mounted on said movable support, a plurality of glass molding stations on said fixed support for molding glass articles in said molds, means for rotatably indexing said movable support and each of said molds past each of said stations in first and second revolutions for molding said glass articles, linkage means for normally holding each of said molds in a closed position during said entire first revolution and a portion of said second revolution, means at one of said stations for opening each of said molds one time during said second revolution, and means following said one station and during said second revolution for closing each of said opened molds.

2. The mechanism of claim 1 wherein each of said molds comprises a pair of cooperating mold half sections and said linkage means comprises an over the center linkage for simultaneously and selectively holding each mold half section in the mold closed position or in the mold open position.

3. The mechanism of claim 1 wherein said linkage means includes first and second link means, cam roller means carried on said first link means, and fixed cam means mounted on said fixed support for engaging said cam roller means for closing said molds after said molds have been moved to the open position by said opening means.

4. The mechanism of claim 3 wherein said opening means comprises an air cylinder mechanism, a trip arm is operatively connected to said cylinder member, said trip arm operating said cam roller means and said link means for moving said linkage means to the open position only.

5. The mechanism of claim 1 wherein said cycle comprises two 360° rotations, said opening means and said closing means both operating in said second 360° of rotation only.

* * * * *